United States Patent
Surendran et al.

(10) Patent No.: US 7,627,113 B2
(45) Date of Patent: *Dec. 1, 2009

(54) METHOD AND SYSTEM FOR HARDWARE ACCELERATOR FOR IMPLEMENTING F8 CONFIDENTIALITY ALGORITHM IN WCDMA COMPLIANT HANDSETS

(75) Inventors: Srinivasan Surendran, San Diego, CA (US); Ruei-Shiang Suen, Dublin, CA (US)

(73) Assignee: Broadcom Corporation, Irvine, CA (US)

(*) Notice: Subject to any disclaimer, the term of this patent is extended or adjusted under 35 U.S.C. 154(b) by 789 days.

This patent is subject to a terminal disclaimer.

(21) Appl. No.: 11/053,099

(22) Filed: Feb. 8, 2005

(65) Prior Publication Data

US 2006/0177050 A1     Aug. 10, 2006

(51) Int. Cl.
H04L 9/00 (2006.01)
H04K 1/00 (2006.01)
H04K 1/04 (2006.01)

(52) U.S. Cl. .................. 380/28; 380/37; 380/44; 380/259; 380/270

(58) Field of Classification Search ............ 380/28, 380/37, 42, 43, 44, 270, 280
See application file for complete search history.

(56) References Cited

U.S. PATENT DOCUMENTS 5,381,480 A * 1/1995 Butter et al. ............ 380/37
7,184,549 B2 * 2/2007 Sorimachi et al. ........ 380/37
2002/0186841 A1 * 12/2002 Averbuj et al. ............ 380/44
2004/0047466 A1 * 3/2004 Feldman et al. ........... 380/37
2004/0131180 A1 * 7/2004 Mazuz et al. ............. 380/37
2004/0156499 A1 * 8/2004 Heo et al. ............... 380/37
2005/0226407 A1 * 10/2005 Kasuya et al. ............ 380/28

OTHER PUBLICATIONS

ARIB STD-T63-35.201 V4.1.0 3G Security; Specification of the 3GPP Confidentiality and Integrity Algorithms; Document 1: f0 and f9 Specification (Release 4).*
3GPP TS 55.216 V6.2.0 (Sep. 2003) Technical Specification, $3^{rd}$ Generation Partnership Project (3GPP), Document 1: A5/3 and GEA3 Specification (Release 6), pp. 1-27.

(Continued)

Primary Examiner—Beemnet W Dada
Assistant Examiner—Darren Schwartz
(74) Attorney, Agent, or Firm—McAndrews, Held & Malloy, Ltd.

(57) ABSTRACT

In a wireless communication system, a method and system for hardware accelerator for implementing the f8 confidentiality algorithm in WCDMA compliant handsets are provided. Input variables may be initialized in a keystream generator and an intermediate value may be generated with a confidentiality key parameter and a key modifier. The number of processing blocks of output bits may be based on the length of the input bitstream. The processing blocks of output bits may be generated utilizing a KASUMI operation and may be based on an immediately previous processing block of output bits, the intermediate value, and an indication of the current processing block of output bits. The processing blocks of output bits may be generated after an indication that an immediately previous processing block of output bits is available. The keystream generator may indicate when a first and any additional processing blocks of output bits have been determined.

26 Claims, 7 Drawing Sheets

OTHER PUBLICATIONS

3GPP TS 35.201 V5.0.0 (Jun. 2002) Technical Specification, 3$^{rd}$ Generation Partnership Project (3GPP), Document 1: f8 and f9 Specification (Release 5), pp. 1-22.

3GPP TS 35.202 V5.0.0 (Jun. 2002) Technical Specification, 3$^{rd}$ Generation Partnership Project (3GPP), Document 2: Kasumi Specification (Release 5), pp. 1-24.

* cited by examiner

METHOD AND SYSTEM FOR HARDWARE ACCELERATOR FOR IMPLEMENTING F8 CONFIDENTIALITY ALGORITHM IN WCDMA COMPLIANT HANDSETS

CROSS-REFERENCE TO RELATED APPLICATIONS/INCORPORATION BY REFERENCE

This application makes reference to:

U.S. patent application Ser. No. 10/924,002 filed Aug. 23, 2004;

U.S. patent application Ser. No. 10/923,954 filed Aug. 23, 2004;

U.S. patent application Ser. No. 10/924,219 filed Aug. 23, 2004;

U.S. patent application Ser. No. 10/924,214 filed Aug. 23, 2004; and

U.S. patent application Ser. No. 10/924,177 filed Aug. 23, 2004.

The above stated applications are hereby incorporated herein by reference in their entirety.

FIELD OF THE INVENTION

Certain embodiments of the invention relate to cryptography. More specifically, certain embodiments of the invention relate to a method and system for hardware accelerator for implementing f8 confidentiality algorithm in WCDMA compliant handsets.

BACKGROUND OF THE INVENTION

In wireless communication systems, the ability to provide secure, confidential transmissions and the ability to verify the integrity and/or authenticate transmissions become highly important tasks as these systems move towards the next generation of data services. The need for advanced security measures may require the implementation of encryption and authentication services into the security architecture of $3^{rd}$ generation mobile communication systems. For example, encryption operations for wideband code division multiple access (WCDMA) applications may be performed at the link layer while authentication operations may be performed at the resource control (RRC) layer, for example.

The link layer may be subdivided into divided into medium access control (MAC), radio link control (RLC), packet data convergence protocol (PDCP), and broadcast/multicast control (BMC). The MAC sublayer may map-logical channels to transport channels, which in turn may be mapped to physical channels by the physical layer. In this regard, the physical layer may be utilized to communicate between a user equipment (UE), such as a mobile phone, and a base station (BS). The MAC sublayer may also handle the UE identification on channels common to all UEs. The RLC sublayer may be utilized to handle segmentation of frames to smaller units suitable for transmission. Encryption or confidentiality operations on user data may be performed at either the MAC or the RLC sublayers, which means that encryption may be limited to communications between the UE and a radio network controller (RNC). The RNC may be utilized to control a set of BSs and may also be responsible for controlling radio resources. Because the RRC runs above the RLC and may be utilized to carry control information over the radio link, authentication operations may be performed on RRC control messages and but may not be performed on user data and/or RLC control data. Moreover, RRC control messages may be encrypted at the link layer by confidentiality operations.

The 3rd Generation Partnership Project (3GPP) has developed normative specifications for a mobile communications confidentiality algorithm, the f8 algorithm, for Wideband Code Division Multiple Access (WCDMA) applications. The f8 confidentiality algorithm developed by the 3GPP is described in the 3GPP, Technical Specification Group Services and System Aspects, 3G Security, Specification of the 3GPP Confidentiality and Integrity Algorithms, Document 1: f8 and f9 Specification, Release 5 (3GPP TS 35.201 V5.0.0, 2002-06). The f8 algorithm may utilize a 128-bit confidentiality key and various other input parameters to generate a keystream that may be utilized to encrypt or decrypt an input bitstream.

The f8 confidentiality algorithm is based on the KASUMI algorithm, which is specified by the 3GPP, Technical Specification Group Services and System Aspects, 3G Security, Specification of the 3GPP Confidentiality and Integrity Algorithms, Document 2: KASUMI Specification, Release 5 (3GPP TS 35.202 V5.0.0, 2002-06). The KASUMI algorithm is a symmetric block cipher with a Feistel structure or Feistel network that produces a 64-bit output from a 64-bit input under the control of a 128-bit cipher key. Feistel networks and similar constructions are product ciphers and may combine multiple rounds of repeated operations, for example, bit-shuffling functions, simple non-linear functions, and/or linear mixing operations. The bit-shuffling functions may be performed by permutation boxes or P-boxes. The simple non-linear functions may be performed by substitution boxes or S-boxes. The linear mixing may be performed using XOR operations.

The f8 confidentiality algorithm utilizes the KASUMI algorithm as a keystream generator in an Output Feedback Mode (OFB). The keystream generator may be specified in terms of a general-purpose keystream function KGCORE as described in 3GPP, Technical Specification Group Services and System Aspects, 3G Security, Specification of the A5/3 Encryption Algorithms for GSM and ECSD, and GEA3 Encryption Algorithms for GPRS, Document 21: A5/3 and GEA3 Specifications, Release 6 (3GPP TS 55.216 V6.2.0, 2003-09). The f8 confidentiality algorithm may be defined by mapping its corresponding inputs to KGCORE function inputs, and mapping KGCORE function outputs to outputs of the confidentiality algorithm. The heart of the KGCORE function is the KASUMI cipher block, and this cipher block may be used to implement the f8 confidentiality algorithm.

Implementing the f8 confidentiality algorithm may require ciphering architectures that provide fast and efficient execution in order to meet the transmission rates, size and cost constraints required by next generation data services and mobile systems. Because of their complexity, implementing the f8 confidentiality algorithm in embedded software to be executed on a general purpose processor on a system-on-chip (SOC) or on a digital signal processor (DSP), may not provide the speed or efficiency necessary for fast secure transmissions in a wireless communication network. Moreover, these processors may need to share some of their processing or computing capacity with other applications needed for data processing and/or transmission, further limiting processing resources available for encryption applications. The development of cost effective integrated circuits (IC) capable of accelerating the speed with which encryption and decryption may be achieved by the f8 confidentiality algorithm is necessary for the deployment of next generation data services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for hardware accelerator for implementing f8 confidentiality algorithm in WCDMA compliant handsets, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for hardware accelerator for implementing f8 confidentiality algorithm in WCDMA compliant handsets. A finite state machine may be utilized to control the operation and data processing of a keystream generator system for WCDMA applications. A plurality of processing stages may be controlled by the finite state machine, where each processing stage may reuse a plurality of processing hardware blocks in the keystream generator system in accordance with the selected mode of operation. This approach may provide a cost effective integrated circuit (IC) solution capable of accelerating the encryption and decryption speed of the f8 confidentiality algorithm and allow for a faster deployment of next generation data services.

Figure 1A:
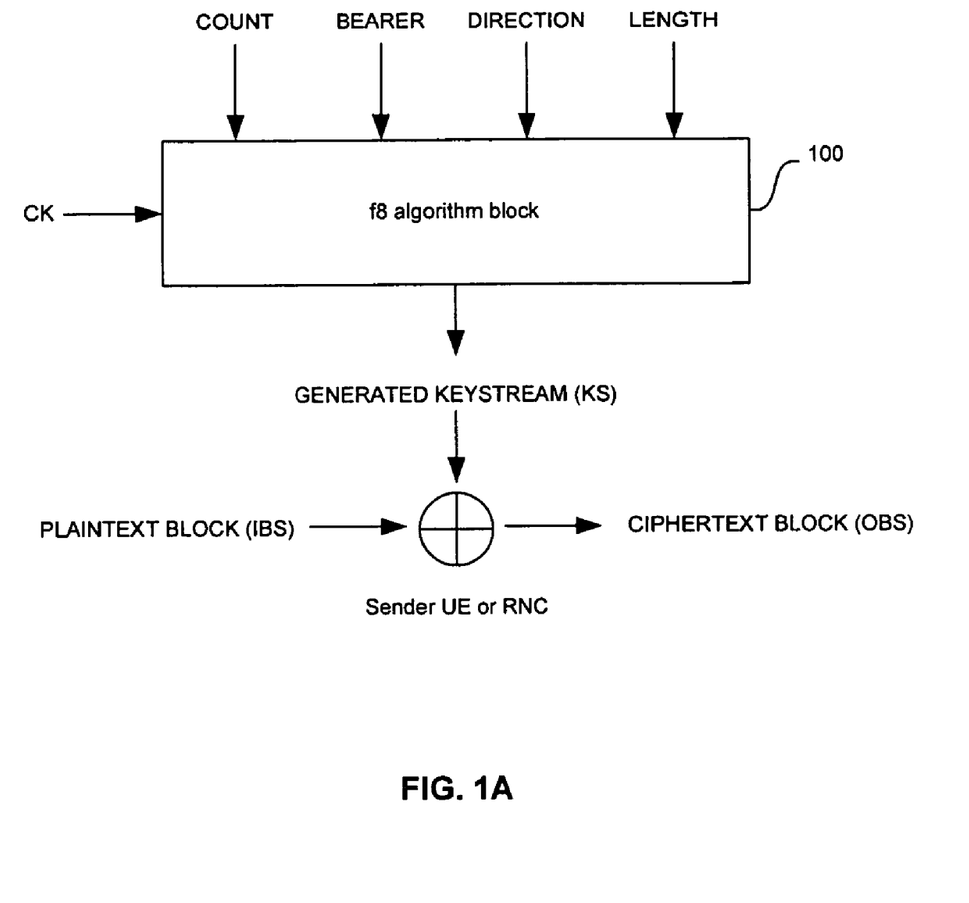
FIG. 1A is a block diagram of an exemplary f8 confidentiality algorithm implementation for encryption applications in WCDMA compliant handsets, which may be utilized in connection with an embodiment of the invention.

FIG. 1A is a block diagram of an exemplary f8 confidentiality algorithm implementation for encryption applications in WCDMA compliant handsets, which may be utilized in connection with an embodiment of the invention. Referring to FIG. 1A, the f8 algorithm block 100 may comprise suitable logic, circuitry, and/or code that may be adapted to perform the f8 confidentiality algorithm as described in 3GPP TS 35.201 V5.0.0, 2002-06 and 3GPP TS 35.202 V5.0.0, 2002-06. In this regard, the f8 algorithm block 100 may receive input parameters COUNT, BEARER, DIRECTION, CK, and LENGTH, and may generate a keystream (KS) as an output parameter. The input parameter COUNT is a frame dependent input comprising 32 bits represented by COUNT[0] . . . COUNT[31]. The input parameter BEARER corresponds to a bearer identity and comprises 5 bits represented by BEARER[0] . . . BEARER[4].

The input parameter DIRECTION corresponds to the direction of transmission and comprises a single bit DIRECTION[0]. In this regard, the input parameter DIRECTION may be utilized to indicate whether the f8 algorithm block 100 is utilized for encrypting or decrypting an input bitstream (IBS) and/or to indicate whether the transmission is from a UE or from an RNC. The input parameter CK is a confidentiality key and comprises 128 bits represented by CK[0] . . . CK[127]. The input parameter LENGTH corresponds to the number of bits in the input bitstream (IBS). In this regard, the IBS may comprise between one and 20,000 bits, inclusive, and may be represented by IBS[0] . . . IBS[LENGTH−1]. The input parameter LENGTH may be represented by a 32-bit integer value, for example.

The f8 algorithm block 100 may generate the KS based on the input parameters COUNT, BEARER, DIRECTION, LENGTH, and CK. The generated keystream may be XORed with a plaintext block to generate a ciphertext block. In this regard, the plaintext block in FIG. 1A corresponds to the IBS and the ciphertext block corresponds to an output bitstream (OBS). The IBS, OBS, and KS may have the same number of bits and that number of bits may correspond to the input parameter LENGTH.

Figure 1B:
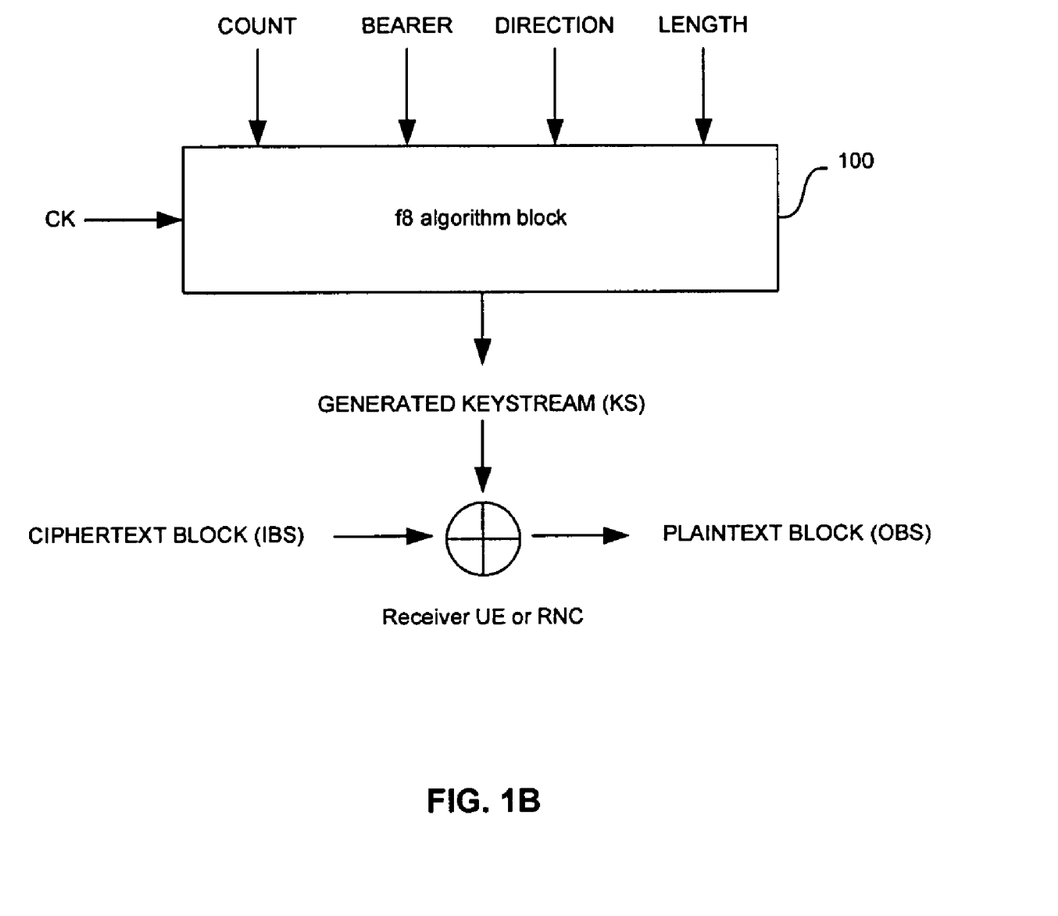
FIG. 1B is a block diagram of an exemplary f8 confidentiality algorithm implementation for decryption applications in WCDMA compliant handsets, which may be utilized in connection with an embodiment of the invention.

FIG. 1B is a block diagram of an exemplary f8 confidentiality algorithm implementation for decryption applications in WCDMA compliant handsets, which may be utilized in connection with an embodiment of the invention. Referring to FIG. 1B, the encryption/decryption operations performed by the f8 algorithm block 100 may be symmetric when utilizing the same confidentiality key CK. The input parameter DIRECTION may be utilized to indicate that the f8 algorithm block 100 is performing a decryption operation. In this regard, the generated keystream may be XORed with a ciphertext block to generate a plaintext block so that the ciphertext block in FIG. 1B corresponds to the IBS and the plaintext block corresponds to an output bitstream (OBS). The IBS, OBS, and KS may have the same number of bits and that number of bits may correspond to the input parameter LENGTH.

Figure 2:
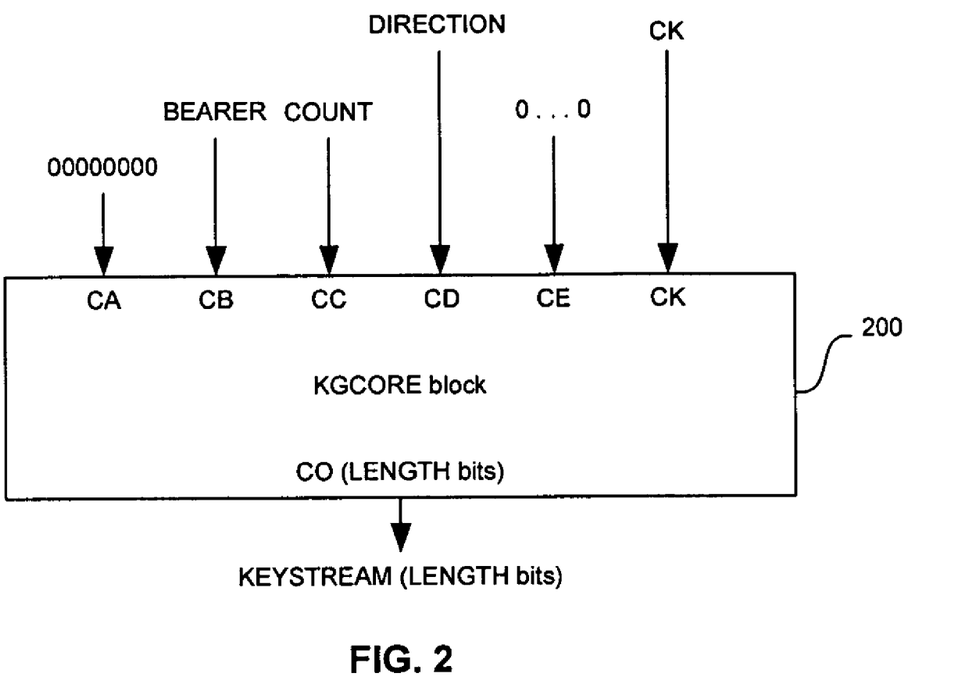
FIG. 2 is a diagram of an exemplary input variable mapping of a general-purpose keystream generator function KGCORE to operate as an f8 keystream generator function, which may be utilized in connection with an embodiment of the invention.

FIG. 2 is a diagram of an exemplary input variable mapping of a general-purpose keystream generator function KGCORE to operate as an f8 keystream generator function, which may be utilized in connection with an embodiment of the invention. Referring to FIG. 2, the KGCORE function block 200 may comprise suitable logic, circuitry, and/or code that may be adapted to map the f8 confidentiality algorithm inputs and outputs to the inputs and outputs of the KGCORE function as described in 3GPP TS 35.216 V6.2.0, 2003-09. For example, the KGCORE function comprises input parameters CA, CB, CC, CD, CE, CK, and CL, and output parameter CO. The input parameter CL specifies the number of output bits and the output parameter CO is therefore represented by CO[0] . . . CO[CL−1]. The f8 confidentiality algorithm comprises input parameters COUNT, BEARER, DIRECTION, LENGTH, and CK, and output parameter KS. In this regard, CA maps to an 8-bit zero integer, CB maps to BEARER, CC maps to COUNT, CD maps to DIRECTION, CK maps to CK, CE maps to a 16-bit zero integer, and CO maps to KS.

Figure 3:
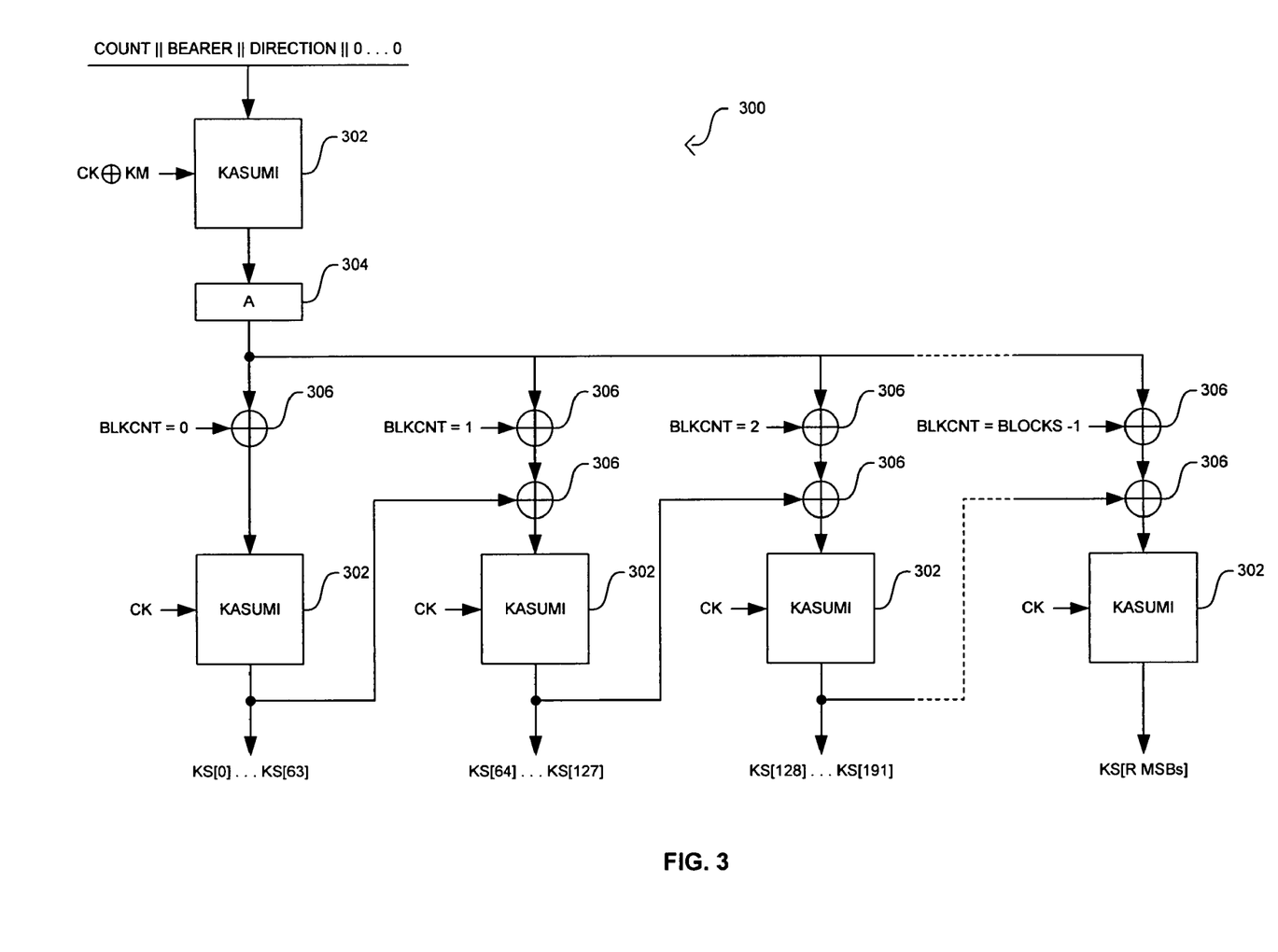
FIG. 3 is a block diagram of a general-purpose keystream generator function KGCORE, which may be utilized in connection with an embodiment of the invention.

FIG. 3 is a block diagram of a general-purpose keystream generator function KGCORE, which may be utilized in connection with an embodiment of the invention. Referring to FIG. 3, the general-purpose keystream generator function KGCORE 300 may comprise a plurality of KASUMI operations 302, a plurality of 64-bit XOR operations 306, and an intermediate value A register 304. The KASUMI operation 302 may comprise suitable logic, circuitry, and/or code that may be adapted to perform a KASUMI algorithm, where the KASUMI algorithm is a symmetric block cipher that produces a 64-bit output from a 64-bit input under the control of a 128-bit cipher key parameter CK. The 64-bit XOR operation 306 may comprise suitable logic, circuitry, and/or code that may be adapted to perform a bit-wise XOR operation on two 64-bit inputs to produce a 64-bit output. The intermediate value A register 304 may comprise suitable logic, circuitry, and/or code that may be adapted to store an intermediate value A generated by an initializing KASUMI operation that operates on a set of input variables to the general-purpose keystream generator function KGCORE 300 with a modified confidentiality key. The intermediate value A register 304 may be, for example, a 64-bit register.

In operation, the set of input variables or input parameters that correspond to the f8 confidentiality algorithm may be transferred to the general-purpose keystream generator function KGCORE 300. The set of input variables may comprise the parameters COUNT, BEARER, DIRECTION, and CK. The data in parameters COUNT, BEARER, and DIRECTION may be stored in the intermediate value A register 304 in the following order: A=COUNT∥BEARER∥DIRECTION∥0 . . . 0, where the ∥ operation represents concatenation and where the right most twenty six (26) bits are set to zero in the intermediate value A register 304. The bit ordering of the parameters in the intermediate value A register 304 may be done from least significant bit to most significant bit, for example, A[0] . . . A[63]= COUNT[0] . . . COUNT[31] BEARER[0] . . . BEARER[4] DIRECTION [0] 0 . . . 0.

The input variables to the general-purpose keystream generator function KGCORE 300 may be initialized to map to the inputs of the f8 confidentiality algorithm:

CA[0] . . . CA[7]=0 0 0 0 0 0 0 0,

CB[0] . . . CB[4]=BEARER[0] . . . BEARER[4],

CC[0] . . . CC[31]=COUNT[0] . . . COUNT[31],

CD[0]=DIRECTION[0],

CE[0] . . . CE[15]=0 0 0 0 0 0 0 0 0 0 0 0 0 0 0 0, and

CL=LENGTH, where the CC parameter may be initialized to correspond to the 32-bit wide COUNT parameter. The cipher key parameter CK in the KGCORE function may be initialized to correspond to the confidentiality key CK in the f8 confidentiality algorithm.

Moreover, the outputs of the general-purpose keystream generator function KGCORE 300 may be initialized to map to the outputs of the f8 confidentiality algorithm:

KS[0] . . . KS[LENGTH−1]=CO[0] . . . CO[LENGTH−1]

where KS corresponds to the keystream bits output generated by the f8 confidentiality algorithm and CO is an output parameter of the general-purpose keystream generator function KGCORE 300.

After initializing the input variables, an initializing KASUMI operation may be performed by a KASUMI operation 302 on the initialized data stored in the intermediate value A register 304. The initializing Kasumi operation may be represented as follows:

A=KASUMI [A]$_{MCK}$, where a KASUMI operation 302 may be performed on the initialized data in the intermediate value A register 304 utilizing a modified confidentiality key parameter MCK and the result of the KASUMI operation may be stored back into the intermediate value A register 304 for further processing. The confidentiality key parameter CK may be modified by a key modifier KM to obtain the modified confidentiality key parameter MCK, where MCK=CK⊕KM and ⊕ corresponds to a bit-wise XOR operation. The key modifier KM may be a 128-bit input variable, for example, KM=0x55555555555555555555555555555555.

Once the general-purpose keystream generator function KGCORE 300 has been initialized for WCDMA applications, at least one processing stage may be initiated to generate the output bits for the output keystream, KS. The general-purpose keystream generator function KGCORE 300 may produce output bits in blocks of 64 bits at a time. Each processing stage in the general-purpose keystream generator function KGCORE 300 may correspond to the generation of a processing block of 64 output bits. The total number of processing stages or processing blocks of outputs bits (BLOCKS) may be determined by rounding the ratio LENGTH/64 to the nearest highest integer. For example, when LENGTH=32, the total number of processing stages or processing blocks of output bits is 1 (BLOCKS=1). In this example, the 32 most significant bits of the processing block of output bits may be utilized while the remaining 32 least significant bits may be discarded. In another example, when LENGTH=984, the total number of processing stages or processing blocks of output bits is 16 (BLOCKS=16). In this example, the 24 most significant bits of the last processing block of output bits may be utilized while the remaining 40 least significant bits may be discarded.

Each processing block of output bits (KSB) may be generated by performing the following KASUMI operation:

KSB$_n$=KASUMI[A⊕BLKCNT⊕KSB$_{n−1}$]$_{CK}$, for 1≦n≦BLOCKS, where KSB$_n$ corresponds to the processing block of output bits in a current processing stage n, KSB$_{n−1}$ corresponds to the processing block of output bits from an immediately previous processing stage (n−1), A is the intermediate value stored in the intermediate value A register 304, CK is the confidentiality key parameter, BLOCKS is a parameter that corresponds to the total number of processing stages or processing blocks of output bits to be generated, and BLKCNT, where BLKCNT=(n−1), is an indication of the processing stage or processing block of output bits currently being processed. In this regard, BLKCNT may correspond to a counter that indicates which processing stage or processing block of output bits is currently being processed. The KASUMI operation and the XOR operations described for generating the processing blocks of output bits KSBN may be performed by the KASUMI operation 302 and by the 64-bit XOR operation 306 respectively.

When generating a first processing block of output bits (KSB$_1$) in a first processing stage, the processing input to the KASUMI operation 302 may be generated based on the values BLKCNT=0 and KSB$_0$=0, where the value 0 may be assigned to BLKCNT and KSB$_0$ during the initialization process. When generating additional processing blocks of output bits, for example, when generating a second processing block of output bits (KSB$_2$) in a second processing stage, the processing input to the KASUMI operation 302 may be generated based on the values BLKCNT=1 and KSB$_1$, where KSB$_1$ is the processing block of output bits from the first processing stage. A similar approach may be followed until the total number of processing stages are completed, where the total number of processing stages has been determined from parameter LENGTH. For example, for the last processing stage, the processing input to the KASUMI operation 302 may be generated based on the values BLKCNT=BLOCKS−1 and KSB$_{BLOCKS-1}$.

Each bit in a processing block of output bits KSB may be mapped to a bit in the output parameter KS in the following manner:

$$KS[((n-1)*64+i]=KSB_n[i] \text{ for } 1 \leq n \leq BLOCKS \text{ and } 0 \leq i \leq 63,$$

where n corresponds to the current processing block of output bits under consideration, and i is a mapping index. Referring back to FIG. 3, the first stage of processing may generate a first processing block of output bits KSB$_1$[0] ... KSB$_1$[63]=KS[0] ... KS[63]. The second stage of processing may generate a second processing block of output bits KSB$_2$[0] ... KSB$_2$[63]=KS[64] ... KS[127]. A similar approach may be followed for any additional or subsequent processing stages. For example, in the case when LENGTH=248 the last processing stage may generate a last processing block of output bits KSB$_4$[0] ... KSB$_4$[55]=KS[192] ... KS[247], where KSB$_4$[56] ... KSB$_4$[63] may be discarded.

Figure 4:
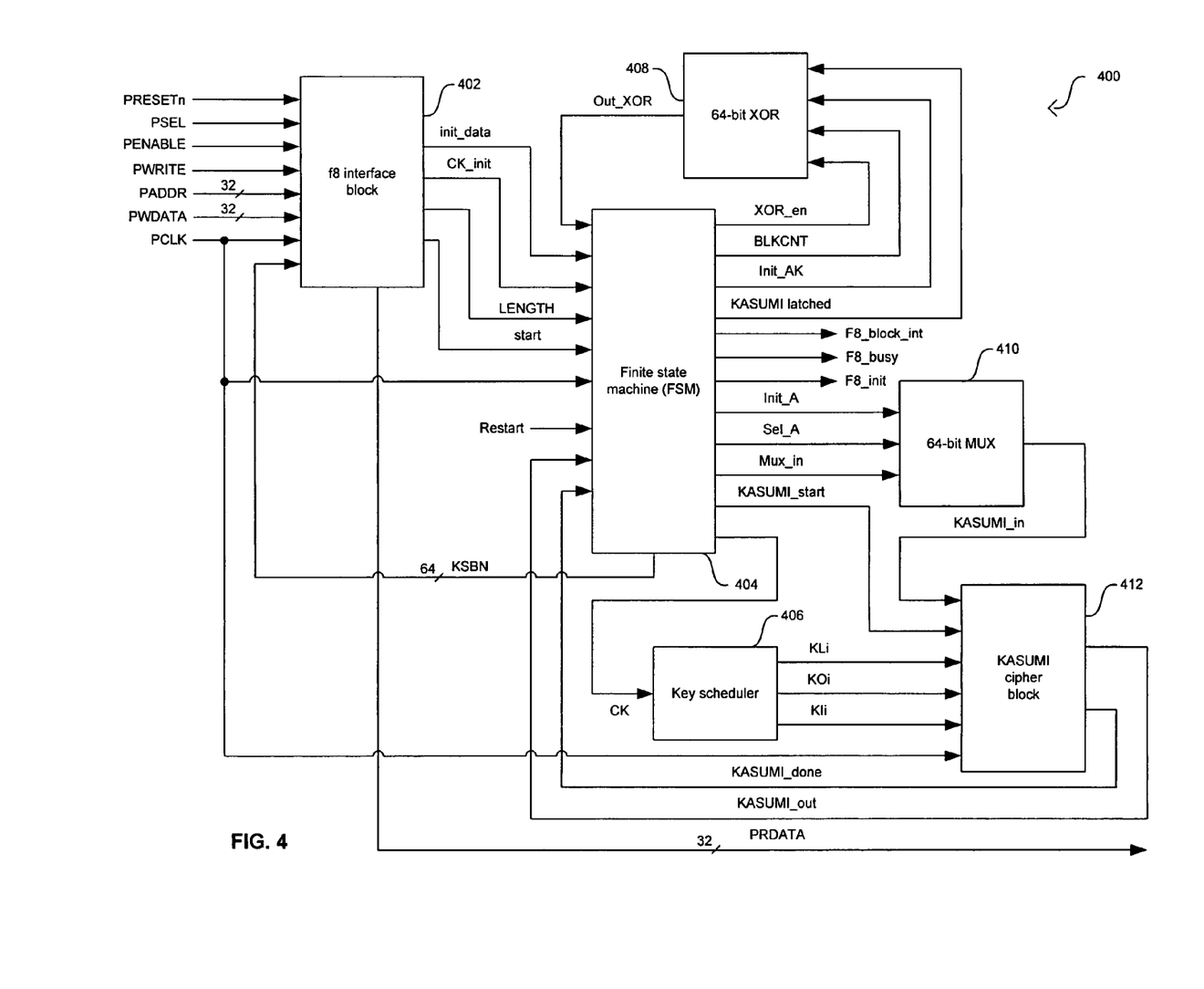
FIG. 4 is a block diagram of an exemplary f8 keystream generating system, in accordance with an embodiment of the invention.

FIG. 4 is a block diagram of an exemplary f8 keystream generating system, in accordance with an embodiment of the invention. Referring to FIG. 4, the f8 keystream generating system 400 may comprise an f8 interface block 402, a finite state machine (FSM) 404, a key scheduler 406, a 64-bit XOR block 408, a 64-bit MUX 410, and a KASUMI cipher block 412. The f8 interface block 402 may comprise suitable logic, circuitry, and/or code that may be adapted to map the inputs of the f8 confidentiality algorithm to the inputs of the general-purpose keystream generator function KGCORE 300.

The f8 interface block 402 may comprise, for example, four 32-bit registers to store the 128-bit confidentiality key CK. In one embodiment of the invention, the f8 interface block 402 may comprise, for example, a 32-bit register, which may be utilized to store the input parameter COUNT and two 32-bit registers which may be utilized to store the input parameters DIRECTION, BEARER, and LENGTH. Logic in the f8 interface block 402 may be utilized to transfer the contents of these registers to the FSM 404. For example, the input parameter LENGTH may be transferred to the FSM 404 to generate the number of processing blocks of output bits or processing stages required. The first of the two 32-bit registers may store, for example, the input parameter LENGTH. The second of the two 32-bit registers may store, for example, the single bit DIRECTION parameter, the 5-bit BEARER parameter, and a start bit. In one embodiment of the invention, the start bit may be set high to indicate to the FSM 404 to initiate processing.

The f8 interface block 402 comprise logic that may be configured to utilize the input parameters DIRECTION, BEARER, and COUNT to generate a 64-bit initialization data (init-data) signal that may be transferred to the FSM 404. The FSM 404 may transfer processing blocks of output bits KSBN to the f8 interface block 402 to store and remain valid until the next processing block of output bits is generated. The f8 interface block 402 may transfer a current processing block of output bits to other processing blocks via a 32-bit output data bus PRDATA, for example. In this regard, the transfer may be pipelined.

The FSM 404 may comprise suitable logic, circuitry, and/or code that may be adapted to control the operation and data processing flow of the f8 keystream generating system 400. The FSM 404 may receive a plurality of input signals and may generate a plurality of output signals in order to perform the operation control and data processing flow control of the f8 keystream generating system 400. The FSM 404 may be configured and/or adapted to accommodate modifications and/or changes in the specifications of the f8 confidentiality algorithm for WCDMA applications.

The key scheduler 406 may comprise suitable logic, circuitry, and/or code that may be adapted to generate a set of subkeys KLi, KOi, and Kli from the confidentiality key CK, where the set of subkeys may be utilized in the KASUMI algorithm of the KASUMI operation 302 in FIG. 3 and i is an index that corresponds to the current round of processing in the eight-round KASUMI algorithm. The key scheduler 406 may generate at least a portion of the set of subkeys before the start of the KASUMI operation. The 64-bit XOR block 408 may comprise suitable logic, circuitry, and/or code that may be adapted to perform a bit-wise XOR operation. A portion of the operation of the 64-bit XOR block 408 may correspond to that of at least one 64-bit XOR operation 306 in FIG. 3. The 64-bit MUX 410 may comprise suitable logic, circuitry, and/or code that may be adapted to select the input to the KASUMI cipher block 412. The KASUMI cipher block 412 may comprise suitable logic, circuitry, and/or code that may be adapted to perform the KASUMI algorithm. A portion of the operation of the KASUMI cipher block 412 may correspond to that of at least one KASUMI operation 302 in FIG. 3.

In operation, the f8 interface block 402 may receive and store the input parameters via an address bus PADDR and a write data bus PWDATA. A PRESETn signal may also be received that may be utilized to reset the f8 confidentiality algorithm operation. The f8 interface block 402 may also receive, for example, a clock signal PCLK, that may be utilized to synchronize all operations, a select signal PSEL, that may be utilized as a peripheral or slave select signal, and an enable signal PENABLE, that may be utilized as a peripheral strobe signal utilized to time all accesses to a peripheral bus.

The f8 interface block 402 may generate and transfer to the FSM 404 a CK initialize signal CK_init, that corresponds to the confidentiality key CK, a LENGTH signal corresponding to the input parameter LENGTH, and a start signal corresponding to the start bit. The FSM 404 may generate the modified confidentiality key parameter (MCK) from the confidentiality key parameter CK and the key modifier KM and may transfer the MCK to the key scheduler 406 to generate a set of subkeys that may be utilized for the initializing KASUMI operation. The FSM 404 may store the value of the key modifier KM.

The FSM 404 may select the Init_A signal to be multiplexed out of the 64-bit MUX 410 as the output signal KASUMI_in, where the Init_A input signal may correspond to the initialized input variables. The FSM 404 may generate the KASUMI_start signal to indicate to the KASUMI cipher block 412 that the KASUMI_in signal and the set of subkeys generated from the modified cipher key parameter MCK may be available for processing. The KASUMI cipher block 412 may generate the intermediate value A and may transfer the results to the finite state machine 404 through the KASUMI_out signal. In this regard, the transfer may be pipelined. The KASUMI cipher block 412 may also generate the KASUMI_done signal to indicate that the initializing KASUMI operation has been completed.

The FSM 404 may proceed to generate at least one processing block of output bits after the intermediate value A has been determined. For example, to generate the first processing block of output bits, $KSB_1$, the finite state machine 404 may transfer the confidentiality key parameter CK to the key scheduler 406 to generate a set of subkeys that may be utilized for the first KASUMI operation. The FSM 404 may enable the 64-bit XOR block 408 via signal XOR_en to generate a first processing input to be utilized during a first processing stage to generate the first processing block of output bits $KSB_1$. The 64-bit XOR block 408 may XOR the BLKCNT signal and the Init_AK signal to generate the first processing input, where BLKCNT=0 and Init_AK is the intermediate value A. The output Out_XOR from the 64-bit XOR block 408 may be transferred to the FSM 404 where it may be transferred to the 64-bit MUX 410 as signal Mux_in.

The FSM 404 may select the Mux_in signal to be multiplexed out of the 64-bit MUX 410 as the output signal KASUMI_in, where the Mux_in input signal may correspond to the first processing input. The finite state machine 404 may generate the KASUMI_start signal to indicate to the KASUMI cipher block 412 that the KASUMI_in signal and the set of subkeys generated from the cipher key parameter CK may be available for processing. The KASUMI cipher block 412 may generate the first processing block of output bits and may transfer the results to the finite state machine 404 through the KASUMI_out signal, where the FSM 404 may latch the values of the KASUMI_out signal for processing in the next processing stage. The KASUMI cipher block 412 may also generate the KASUMI_done signal to indicate that the KASUMI operation corresponding to the first processing stage has been completed. The finite state machine 404 may update the value of the BLKCNT signal after receiving the KASUMI_done signal from the KASUMI cipher 412 or after sending the KASUMI_start signal to the KASUMI cipher 412.

The FSM 404 may proceed to generate additional processing block of output bits after the first processing block of output bits has been determined. Each processing block of output bits may be transferred to the f8 interface block 402 where it may be stored and transferred to the output data bus PRDATA. In this regard, the transfer may be pipelined. The FSM 404 may generate an f8_block_int interrupt signal to indicate that a 64-bit processing block of output bits is available. To generate the second processing block of output bits, $KSB_2$, for example, the KASUMI cipher block 412 may utilize the set of subkeys generated by the key scheduler 406 for the first KASUMI operation. The finite state machine 404 may enable the 64-bit XOR block 408 via signal XOR_en to generate a second processing input to be utilized during a second processing stage to generate the second processing block of output bits $KSB_2$. The 64-bit XOR block 408 may XOR the BLKCNT signal, the Init_AK signal, and the immediately previous processing block of output bits to generate the second processing input, where BLKCNT=1, Init_AK is the intermediate value A, and the immediately previous processing block of output bits $KSB_1$ corresponds to the latched KASUMI_out values from the previous processing stage. The output Out_XOR from the 64-bit XOR block 408 may be transferred to the FSM 404 where it may be transferred to the 64-bit MUX 410 as signal Mux_in.

The FSM 404 may select the mux input signal, Mux_in, to be multiplexed out of the 64-bit MUX 410 as the output signal KASUMI_in, where Mux_in may correspond to the second processing input. The FSM 404 may generate the KASUMI_start signal to indicate to the KASUMI cipher block 412 that the KASUMI_in signal and the set of subkeys generated from the cipher key parameter CK may be available for processing. The KASUMI cipher block 412 may generate the second processing block of output bits and may transfer the results to the FSM 404 through the KASUMI_out signal. The KASUMI cipher block 412 may also generate the KASUMI_done signal to indicate that the KASUMI operation corresponding to the second processing stage has been completed. The FSM 404 may update the value of the BLKCNT signal after receiving the KASUMI_done signal from the KASUMI cipher 412 or after sending the KASUMI_start signal to the KASUMI cipher 412.

A similar approach may be followed for the remaining additional processing blocks of output bits as determined from the LENGTH input parameter. In this regard, the FSM 404 may follow the approach described above and control the operation and data flow control of the f8 keystream generating system 400 to generate the additional processing blocks of output bits. When all the output bits in the output keystream are generated, the FSM 404 may generate an f8_int interrupt signal to indicate that all the output bits for the output keystream have been generated and the f8 keystream generating system 400 is ready to start processing a new set of input variables. During operation, the FSM 404 may generate an f8_busy signal to indicate that the core f8 confidentiality operation is being performed.

Figure 5:
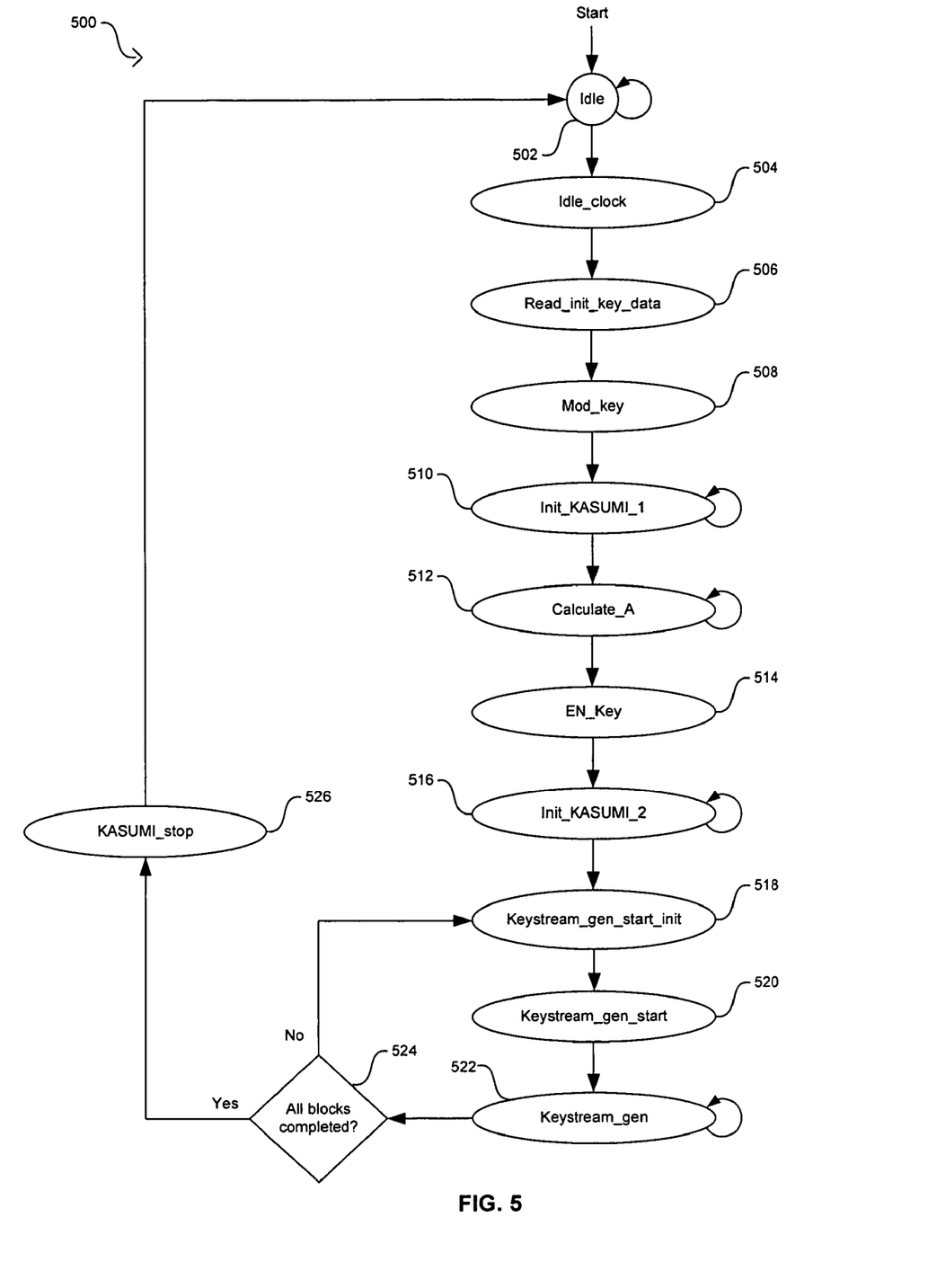
FIG. 5 is an exemplary state diagram illustrating the operation of a finite state machine in the f8 keystream generating system, in accordance with an embodiment of the invention.

FIG. 5 is an exemplary state diagram illustrating the operation of a finite state machine in the f8 keystream generating system, in accordance with an embodiment of the invention. Referring to FIG. 5, the FSM 404 may remain in a state idle 502 until a start signal is received. The start signal received in state idle 502 may be an asynchronous signal and may need to be synchronized to the system clock. Once the start signal is received, the finite state machine 404 may proceed to a state idle_clock 504, where the internal clocks in the FSM 404 may be powered up after being powered down previously to conserve energy while the f8 keystream generating system 400 was not in use. Once the internal clocks have been powered up, the start signal may be synchronized and the FSM 404 may proceed to a state read_init_key_data 506, where the confidentiality key parameter CK and the initialized data may be transferred from the f8 interface block 402.

With the confidentiality key parameter CK available for processing, the FSM 404 may generate the modified confidentiality key parameter (MCK) in a state mod_key 508. After the modified confidentiality key parameter MCK has been determined, the FSM 404 may proceed to a state init_KASUMI_1 510, where the set of subkeys for use during the initializing KASUMI operation may be determined by the key scheduler 406 in FIG. 4. The finite state machine 404 may remain in the state init_KASUMI_1 510 for a specified amount of time, for example, two clock cycles, until the combinational logic in the key scheduler 406 completes generating all the subkeys. In another embodiment, the finite state machine 404 may require the key scheduler 406 to generate and transfer the subkeys to the KASUMI cipher block 412 in FIG. 4 during the initializing KASUMI operation instead of before the initializing KASUMI operation begins.

With the initializing subkeys available for processing, the FSM 404 may proceed to a state calculate_A 512, where the KASUMI cipher block 412 may determine the intermediate value A, may transfer the determined intermediate value A to the FSM 404, and may generate the KASUMI_done signal to indicate that the intermediate value A has been determined. After completing the state calculate_A 512, the FSM 404 may proceed to a state en_key 514, where the confidentiality key parameter CK may be transferred to the key scheduler 406. After the confidentiality key parameter CK is transferred to the key scheduler 406, the FSM 404 may proceed to a state init_KASUMI_2 516, where the set of subkeys for use during the first processing stage and any of the additional processing stages may be determined by the key scheduler 406.

With the set of subkeys necessary to generate the output keystream KS available, the FSM 404 may proceed to a state keystream_gen_start_init 518, where the first processing stage may begin by setting the parameters BLKCNT and $KSB_0$ to zero, where BLCKNT corresponds to the block count or current processing stage. Following the state keystream_gen_start_init 518, the FSM 404 may proceed to a state keystream_gen_start 520, where the KASUMI_start signal may be generated to initiate the KASUMI operation in the KASUMI cipher block 412 for the first processing stage. The FSM 404 may then proceed to a state keystream_gen 522, where the KASUMI cipher block 412 may determine the first processing block of output bits, may transfer the first processing block of output bits to the FSM 404, and may generate the KASUMI_done signal to indicate that the first processing block of output bits has been generated. After generating a processing block of output bits, the FSM 404 may generate the f8_block_int interrupt signal.

In step 524, the FSM 404 may determine whether the last processing block of output bits has been determined based on the value of input parameter LENGTH by determining whether BLKCNT=(BLOCKS-1) after the KASUMI_done signal is generated during the state keystream_gen 522. When the BLKCNT does not correspond to the last processing stage, the FSM 404 may proceed to the state keystream_gen_start_init 518 and update the BLKCNT and $KSB_{n-1}$ parameters for use during the next processing stage. Additional processing blocks of output bits may be determined by repeating the state keystream_gen_start_init 518, the state keystream_gen_start 520, and the state keystream_gen 522 for each of the additional processing stages. Referring back to step 524, when the BLKCNT corresponds to the last processing stage, the FSM 404 may proceed to a state KASUMI_stop 526, where the FSM 404 may generate the f8_int interrupt signal to indicate that all the output bits for the output keystream have been generated and the f8 keystream generating system 400 is ready to start processing a new set of input variables. After generating the f8_int interrupt signal f8_int, the FSM 404 may return to the state idle 502 to wait for the next start signal to be received.

Figure 6:
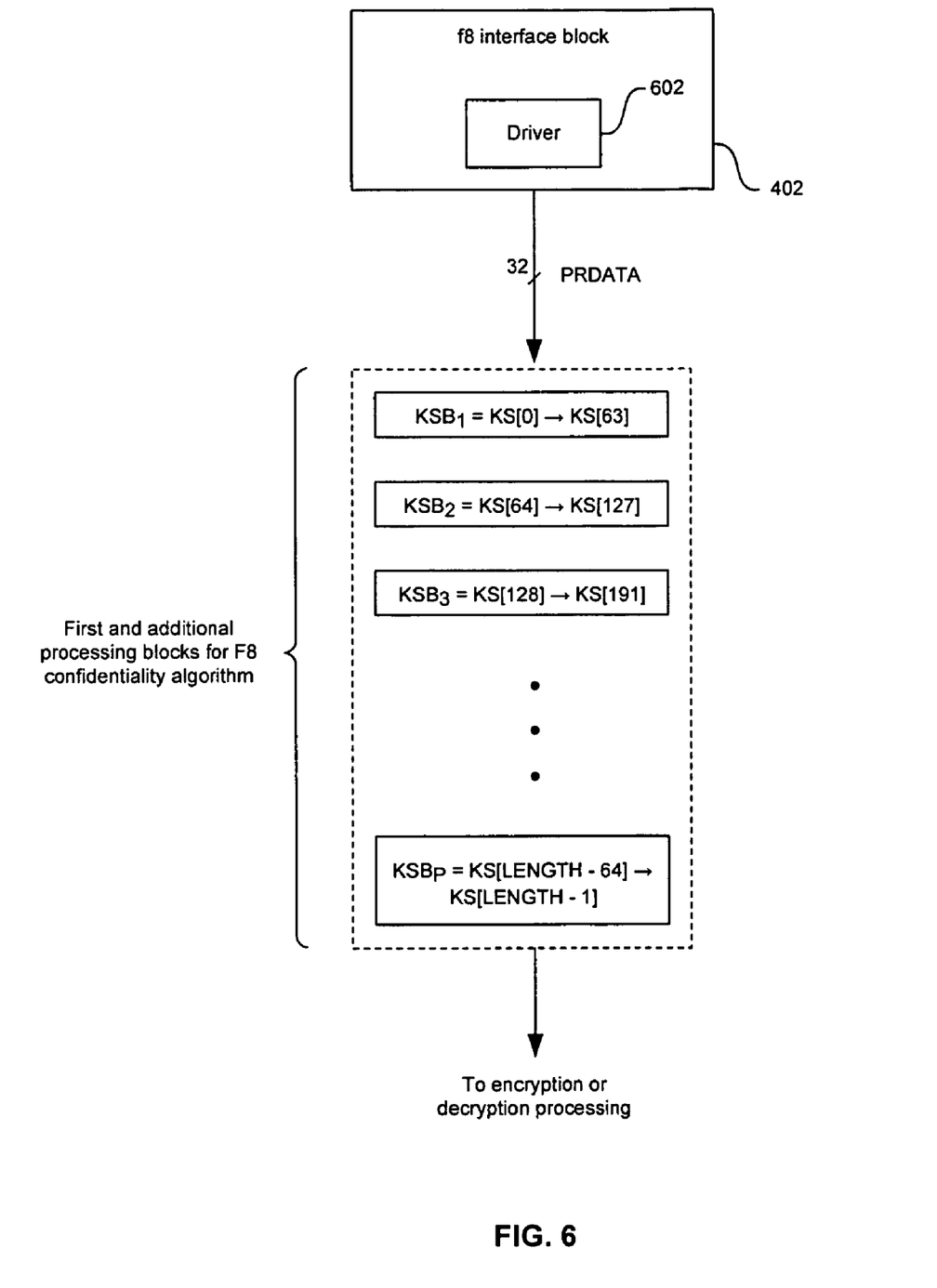
FIG. 6 illustrates the generation of an exemplary KS keystream by the finite state machine in the f8 keystream generating system for WCDMA compliant handsets, in accordance with an embodiment of the invention.

FIG. 6 illustrates the generation of an exemplary KS keystream by the finite state machine in the f8 keystream generating system for WCDMA compliant handsets, in accordance with an embodiment of the invention. Referring to FIG. 6, the f8 interface block 402 in FIG. 4 may also comprise a driver 602. The driver 602 may comprise suitable logic, circuitry, and/or code that may be adapted to transfer the processing group of output bits for each processing stage to the output data bus PRDATA to generate the keystream KS for the f8 confidentiality algorithm. In this regard, the driver 602 may transfer the processing blocks of output bits $KSB_n$ to a processing block where it may be utilized to encrypt or decrypt an input bitstream. In the exemplary keystream shown in FIG. 6, the driver 602 may transfer P processing blocks of output bits to the output data bus PRDATA for encryption or decryption operations.

The approach described herein for implementing f8 confidentiality algorithm in WCDMA compliant handsets may produce a cost effective IC solution capable of accelerating the encryption and decryption speed of the f8 confidentiality algorithm and allow for a faster deployment of next generation data services.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for providing secure data, the method comprising:
   performing via one or more processors and/or circuits within a communication device:
   initializing a keystream generator with input variables for implementing f8 confidentiality algorithm;
   generating an intermediate value, which is utilized to generate an output keystream, based on at least a portion of said input variables, a confidentiality key and a key modifier;
   generating a first processing block of output bits and a signal indicating when said first processing block of output bits is generated;
   receiving a signal indicating that at least one additional processing block of output bits is to be generated and a signal which indicates that an immediately generated previous processing block of output bits is generated, wherein said signal indicating that at least one additional processing block of output bits is to be generated is based on at least one of said input variables which defines an input bitstream length; and
   generating said at least one additional processing block of output bits utilizing said immediately generated previous processing block of output bits, said generated intermediate value, said confidentiality key, and an indication of which processing block of output bits is being processed.

2. The method according to claim 1, comprising pipelining transfer said immediately generated previous processing block of output bits from a previous processing stage to a current processing stage when said signal indicating when said immediately generated previous processing block of output bits is generated.

3. The method according to claim 1, comprising generating a modified confidentiality key by XORing said confidentiality key and said key modifier.

4. The method according to claim 3, comprising generating said intermediate value by performing a KASUMI operation on said at least a portion of said input variables with said modified confidentiality key after a signal is generated to indicate that said KASUMI operation is to begin.

5. The method according to claim 1, comprising generating a first processing input by XORing said generated intermediate value and said indication of which processing block of output bits is being processed.

6. The method according to claim 5, comprising generating said first processing block of output bits by performing a KASUMI operation on said generated first processing input with said confidentiality key after a signal is generated to indicate that said KASUMI operation is to begin.

7. The method according to claim 1, comprising generating at least one additional processing input to generate said at least one additional processing block of output bits by XORing the result of XORing said generated intermediate value and said indication of which processing block of output bits is being processed with said immediately generated previous processing block of output bits.

8. The method according to claim 7, comprising generating said at least one additional processing block of output bits by performing a KASUMI operation on said generated at least one additional processing input with said confidentiality key after a signal is generated to indicate that said KASUMI operation is to begin.

9. The method according to claim 1, comprising generating at least a portion of a set of subkeys utilized during a KASUMI operation from said confidentiality key after a signal is generated to indicate that said at least a portion of a set of subkeys is to be generated.

10. The method according to claim 1, comprising selecting between said at least a portion of said input variables and at least one generated processing input as an input to a KASUMI operation.

11. The method according to claim 1, comprising generating said indication of which processing block of output bits is being processed by counting the number of occurrences of said signal indicating when an immediately generated previous processing block of output bits is generated.

12. The method according to claim 1, comprising generating a signal indicating that a last of said at least one additional processing block of output bits is generated.

13. The method according to claim 1, comprising pipelining transfer said first processing block of output bits and said at least one additional processing blocks of output bits.

14. A system for implementing the f8 confidentiality algorithm, the system comprising:
one or more circuits that are operable to initialize a keystream generator with input variables for implementing f8 confidentiality algorithm;
said one or more circuits are operable to generate an intermediate value, which is utilized to generate an output keystream, based on at least a portion of said input variables, a confidentiality key and a key modifier;
said one or more circuits are operable to generate a first processing block of output bits and a signal indicating when said first processing block of output bits is generated;
said one or more circuits are operable to receive a signal indicating that at least one additional processing block of output bits is to be generated and a signal which indicates that an immediately generated previous processing block of output bits is generated, wherein said signal indicating that at least one additional processing block of output bits is to be generated is based on at least one of said input variables which defines an input bitstream length; and
said one or more circuits are operable to generate said at least one additional processing block of output bits utilizing said immediately generated previous processing block of output bits, said generated intermediate value, said confidentiality key, and an indication of which processing block of output bits is being processed.

15. The system according to claim 14, wherein said one or more circuits are operable to pipeline transfers said immediately generated previous processing block of output bits from a previous processing stage to a current processing stage when said signal indicating when said immediately generated previous processing block of output bits is generated.

16. The system according to claim 14, wherein said one or more circuits are operable to generate a modified confidentiality key by XORing said confidentiality key and said key modifier.

17. The system according to claim 16, wherein said one or more circuits are operable to generate said intermediate value by performing a KASUMI operation on said at least a portion of said input variables with said modified confidentiality key after a signal is generated to indicate that said KASUMI operation is to begin.

18. The system according to claim 14, wherein said one or more circuits are operable to generate a first processing input by XORing said generated intermediate value and said indication of which processing block of output bits is being processed.

19. The system according to claim 18, wherein said one or more circuits are operable to generate said first processing block of output bits by performing a KASUMI operation on said generated first processing input with said confidentiality key after a signal is generated to indicate that said KASUMI operation is to begin.

20. The system according to claim 14, wherein said one or more circuits are operable to generate at least one additional processing input to generate said at least one additional processing block of output bits by XORing the result of XORing said generated intermediate value and said indication of which processing block of output bits is being processed with said immediately generated previous processing block of output bits.

21. The system according to claim 20, wherein said one or more circuits are operable to generate said at least one additional processing block of output bits by performing a KASUMI operation on said generated at least one additional processing input with said confidentiality key after a signal is generated to indicate that said KASUMI operation is to begin.

22. The system according to claim 14, wherein said one or more circuits are operable to generate at least a portion of a set of subkeys utilized during a KASUMI operation from said confidentiality key after a signal is generated to indicate that said at least a portion of a set of subkeys is to be generated.

23. The system according to claim 14, wherein said one or more circuits are operable to select between said at least a portion of said input variables and at least one generated processing input as an input to a KASUMI operation.

24. The system according to claim 14, wherein said one or more circuits are operable to generate said indication of which processing block of output bits is being processed by counting the number of occurrences of said signal indicating when an immediately generated previous processing block of output bits is generated.

25. The system according to claim 14, wherein said one or more circuits are operable to generate a signal indicating that a last of said at least one additional processing block of output bits is generated.

26. The system according to claim 14, wherein said one or more circuits are operable to pipeline transfers said first processing block of output bits and said at least one additional processing blocks of output bits.

* * * * *

UNITED STATES PATENT AND TRADEMARK OFFICE
CERTIFICATE OF CORRECTION

PATENT NO. : 7,627,113 B2 Page 1 of 1
APPLICATION NO. : 11/053099
DATED : December 1, 2009
INVENTOR(S) : Surendran et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1284 days.

Signed and Sealed this

Second Day of November, 2010

David J. Kappos
*Director of the United States Patent and Trademark Office*